United States Patent
Stenbock et al.

(10) Patent No.: US 7,640,098 B2
(45) Date of Patent: Dec. 29, 2009

(54) PROCESS FOR GENERATING TRAVEL PLANS ON THE INTERNET

(75) Inventors: Roger Maria Stenbock, Canby, OR (US); Kyle Braden Everson, Salem, OR (US)

(73) Assignee: Stenbock & Everson, Inc., Aurora, OR (US)

( * ) Notice: Subject to any disclaimer, the term of this patent is extended or adjusted under 35 U.S.C. 154(b) by 0 days.

(21) Appl. No.: 11/243,290

(22) Filed: Sep. 28, 2005

(65) Prior Publication Data

US 2006/0031006 A1     Feb. 9, 2006

Related U.S. Application Data

(62) Division of application No. 09/919,672, filed on Jul. 31, 2001.

(51) Int. Cl.
   *G06F 19/00* (2006.01)
(52) U.S. Cl. .................. 701/200; 709/219; 340/995.1; 340/995.12
(58) Field of Classification Search .............. 701/3, 701/206, 201, 202, 200, 208, 209; 340/990, 340/995.1, 995.23, 601, 602, 995.12; 463/42; 382/113; 345/763, 835; 709/219, 238; 702/3, 702/188; *G06F 19/00*
See application file for complete search history.

(56) References Cited

U.S. PATENT DOCUMENTS

| | | | |
|---|---|---|---|
| 4,347,618 A | 8/1982 | Kavouras et al. | |
| 4,521,857 A | 6/1985 | Reynolds, III | |
| 4,807,158 A | 2/1989 | Blanton et al. | |
| 4,827,419 A | 5/1989 | Selby, III | |
| 5,111,400 A | 5/1992 | Yoder | |
| 5,265,025 A | 11/1993 | Crabill et al. | |
| 5,343,395 A | 8/1994 | Watts | |
| 5,363,107 A | 11/1994 | Gertz et al. | |
| 5,369,589 A | 11/1994 | Steiner | |
| 5,379,215 A | 1/1995 | Kruhoeffer et al. | |
| 5,390,237 A | 2/1995 | Hoffman, Jr. et al. | |
| 5,432,895 A | 7/1995 | Myers | |
| 5,490,239 A | 2/1996 | Myers | |
| 5,517,193 A | 5/1996 | Allison et al. | |
| 5,548,515 A | 8/1996 | Pilley et al. | |
| 5,568,385 A | 10/1996 | Shelton | |
| 5,583,972 A | 12/1996 | Miller | |
| 5,675,746 A | 10/1997 | Marshall | |
| 5,717,589 A | 2/1998 | Thompson et al. | |
| 5,948,040 A * | 9/1999 | DeLorme et al. | ............ 701/201 |
| 5,999,882 A * | 12/1999 | Simpson et al. | ................ 702/3 |
| 6,021,374 A | 2/2000 | Wood | |
| 6,199,008 B1 | 3/2001 | Aratow et al. | |
| 6,216,141 B1 * | 4/2001 | Straub et al. | ................ 715/513 |

(Continued)

*Primary Examiner*—Tuan C To
(74) *Attorney, Agent, or Firm*—Ipsolon LLP

(57) ABSTRACT

A process for generating a flight plan includes accessing over a computer network from a client computer a selected composite flight navigation chart from among plural selected composite flight navigation charts stored at a server computer, each selected composite flight navigation chart including a flight chart merged with flight navigation waypoints. The selected composite flight navigation chart is downloaded from the server computer to the client computer. A flight route is indicated on the selected composite flight navigation chart at the client computer and transmitted to the server computer. The flight route is incorporated into the selected composite flight navigation chart at the server computer and returned to the client computer as a flight plan.

23 Claims, 3 Drawing Sheets

U.S. PATENT DOCUMENTS

| | | | |
|---|---|---|---|
| 6,269,369 B1* | 7/2001 | Robertson | 707/10 |
| 6,289,277 B1* | 9/2001 | Feyereisen et al. | 701/202 |
| 6,314,370 B1* | 11/2001 | Curtright | 701/213 |
| 6,353,794 B1* | 3/2002 | Davis et al. | 701/201 |
| 6,532,475 B1* | 3/2003 | Nakano et al. | 707/104.1 |
| 6,603,477 B1* | 8/2003 | Tittle | 345/440 |
| 6,606,559 B1* | 8/2003 | Beckmann et al. | 701/213 |
| 6,741,933 B1* | 5/2004 | Glass | 701/213 |
| 6,810,323 B1* | 10/2004 | Bullock et al. | 701/206 |
| 6,868,169 B2* | 3/2005 | Staas et al. | 382/113 |
| 6,922,631 B1* | 7/2005 | Dwyer et al. | 701/206 |
| 6,947,976 B1* | 9/2005 | Devitt et al. | 709/219 |
| 7,209,632 B2* | 4/2007 | Nono | 386/46 |
| 2001/0033284 A1* | 10/2001 | Chan | 345/441 |
| 2002/0095256 A1* | 7/2002 | Jones et al. | 701/200 |
| 2006/0026170 A1* | 2/2006 | Kreitler et al. | 707/10 |

* cited by examiner

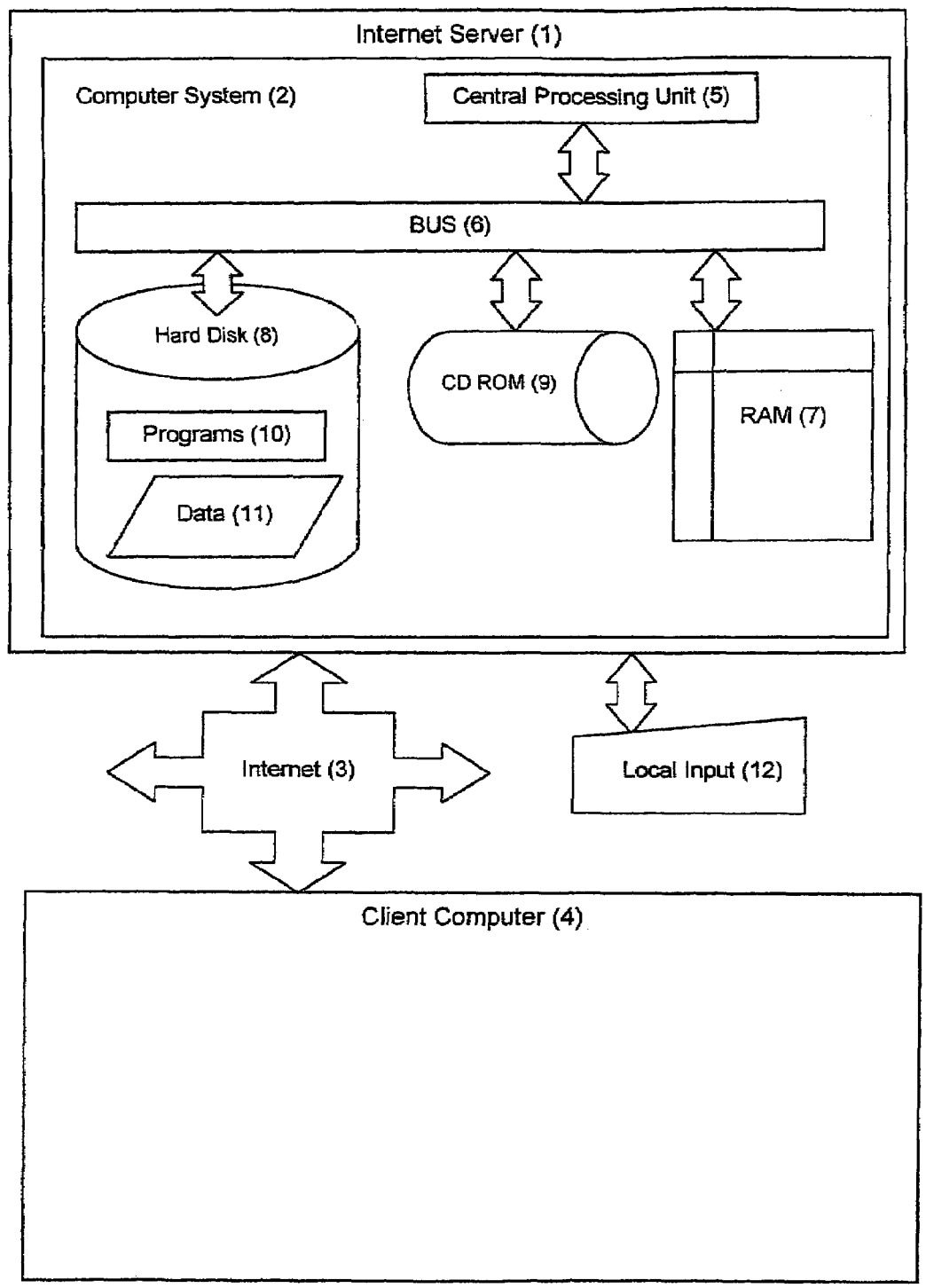
Figure A1 Server System

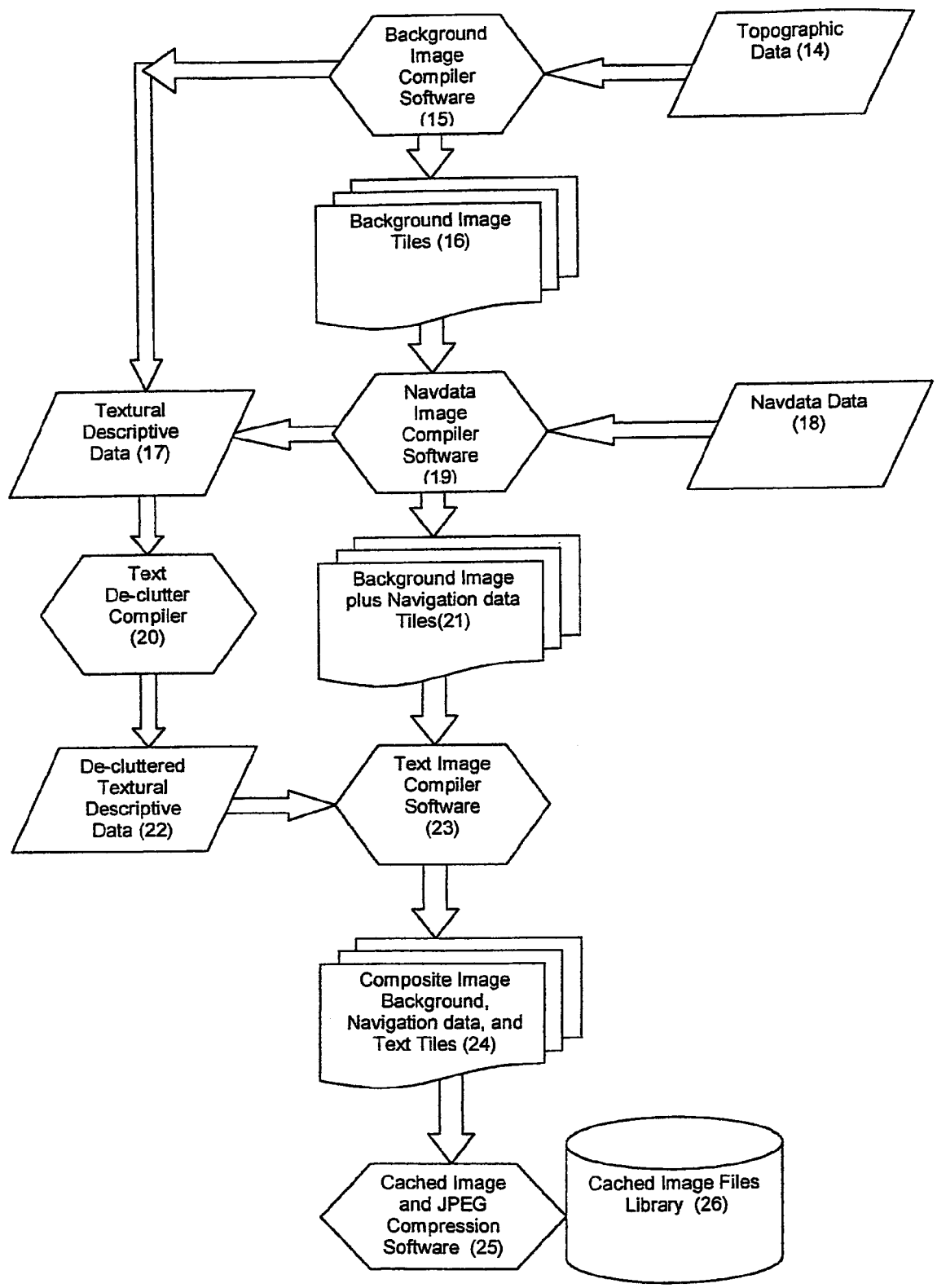
Figure A2 Chart Generator System

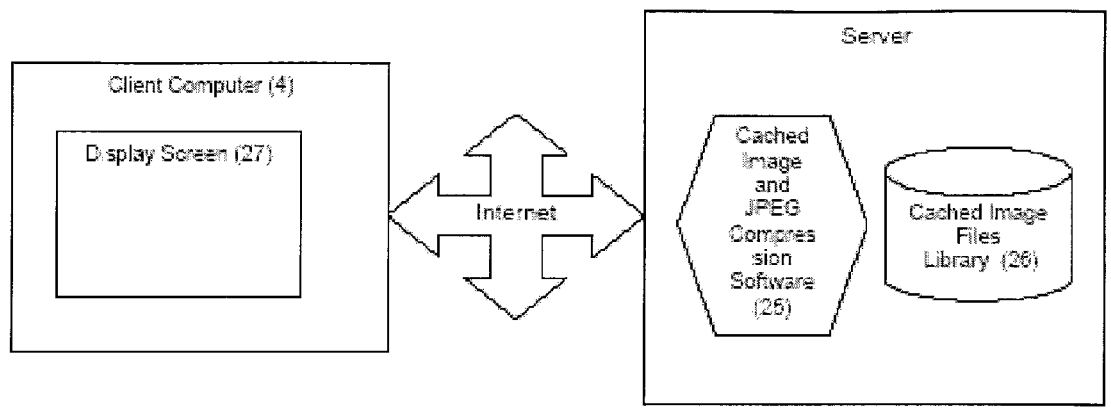
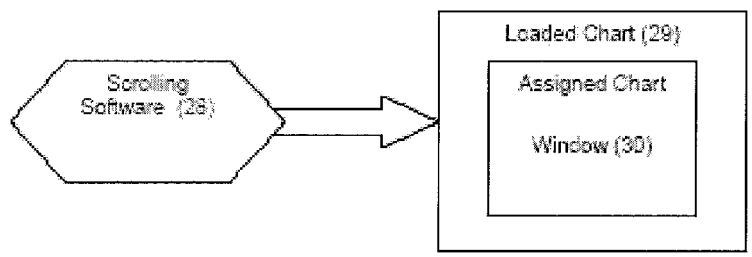
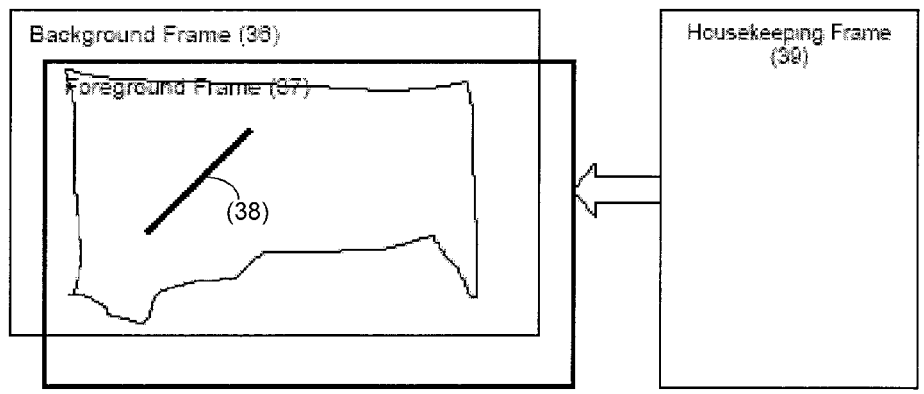
Figure A3 Chart Retrieval, Scrolling, and Routing System

PROCESS FOR GENERATING TRAVEL PLANS ON THE INTERNET

RELATED APPLICATION

This is a divisional of application Ser. No. 09/919,672, filed Jul. 31, 2001.

BACKGROUND OF THE INVENTION

This invention relates generally to the field of aviation software, and more particularly to a process for generating computer flight plans on the Internet. However, as will become obvious later, additional applications of this invention may also include the field of cartography, route planning for motor vehicles, marine vehicles and similar utilization. The present invention relates to a topographical terrain, aviation navigation, routing, obstruction and weather flight planning system that provides information for preflight use by pilots. In particular, the invention uses a topographical database, an aviation navigation database, an obstruction database, a weather database, an airplane specific database, and an air traffic route database to display a flight path over a given path while combining weather data (e.g. wind, temperature and clouds), aviation charts (e.g. special use airspace, airways, and navigational facilities, along with visibilities and ceilings), and predicted aircraft performance data (e.g. range, speed and climb rate) to permit increased operational awareness by the pilot and enhance display of possible hazardous situations.

Pilots have long required assistance in making decisions whether or not to fly in given weather conditions, in a particular type of aircraft and over a given terrain. This required the pilot to make a judgment as to go or not to go. If the pilot chooses to go, he/or she must then decide the safety of flying to a given destination airport or along a pre-planned route. Currently, the Federal Aviation Administration (FAA, National Weather Service (NWS)) and other government agencies aid pilots by providing weather data including wind direction and speed, weather conditions such as precipitation and other pertinent data. Often this information is in an obscure configuration and is strenuous for beginning pilots to comprehend. This information must then be brought to bear in the context of an abundance of regulations and aircraft performance parameters, making this an overwhelming task. Furthermore, experienced pilots still often find the information cryptic to retrieve and have difficulty grasping specific data relevant to their flight from the large amount of data obtainable. Compounding the situation further, commercial operators in their unique operations have their own supplementing FARs (e.g. Federal Aviation Regulations). These FARs must be recognized and followed by their pilots.

Some coarse graphic computer flight planning was first made commercially available in 1989. However, these products relied on a software installation on the user's computer. In contrast, this invention relies on the Internet, also referred to as the Internet. The Internet has seen rapid growth in the number of applications and as a result, in the number of users. Since the Internet allows most any computer with a compatible web browser access to a web site from virtually any Internet connection, it is possible to create an Internet web site which provides flight planning capability.

In this invention, all flight planning elements such as aircraft performance, topography, navigation, obstruction, road and geopolitical data are stored on the host Internet Server (host computer which creates the web pages served to the Client). As a result, the Client computer (remote user computer connected to the Internet) needs only modest memory and storage capability. Furthermore, virtually all flight planning computation and chart creation are executed by the Server, as a result, the Client computer does not require exceptional computing speed or advanced graphic computational capability. However, the Client computer must still provide an Internet browser of sufficient compatibility to accept the web pages provided by the Server.

When flight planning, be it by using a computer, or by using traditional paper and pencil, current, up-to-date data are crucial. This requires the pilot preparing the flight plan to ensure that the latest data is available. Since it is possible to inadvertently use out-of-date data, such as out-of-date computer disks or charts, errors may be introduced into the flight plan. This invention relies on the Internet. The Client computer is connected to the Internet, which in turn, is connected to the Server. Since the burden of data currency is now shifted to the Server, the Client computer is, therefore, not required to store navigation data as it would be in traditional computer flight planning software. As a result, the likelihood of using out-of-date data is greatly reduced with this invention.

Also, since this invention allows for remote data entry by a client computer and editing of navigation and other important flight planning data, keeping the data current is more efficient and timely. Furthermore, as features of this invention are added or improved, they become immediately available to the client computer connected to the Internet.

Some flight planning systems were developed to automate the delivery of flight planning route and weather to pilots. For example, U.S. Pat. No. 6,199,008 describes a system that included some flight planning function such as a terrain, route, navigation and a weather data base. However, this system executes the data processing, chart generation and flight planning computation on the client computer and, except for weather delivery data, is not connected to the Internet. The system receives weather information from a plurality of weather reporting organizations including the NWS, FAA (e.g. National Weather Service and Federal Aviation Administration) and others. The system then computes flight plan information for preflight and in-flight use.

U.S. Pat. No. 5,432,895 describes a virtual reality imaging system. The system provides pilots with a depiction of all the multidimensional space encompassing an airport. This may includes weather, air traffic and spatial relationships of the aircraft with respect to the airport and the ground level. The prime implementation of this system is not, however, through the use of the Internet. Since the technology and software languages between traditional application software and Internet implementation are very different, it would not be practical to convert an existing application to run on the Internet. The current computer flight planners consist of Destination Direct by Delta Technology, FliteSoft by RMS Technology, and FliteStar by Jeppesen Sanderson Inc. A patent search does not reveal patents on either product. These products create flight plans much the same as cited in this invention. While these two products allow connection to the Internet for weather data extraction, all flight planning computations and chart generation is accomplished autonomously on the client computer. Furthermore, since the technology and software languages between traditional application software and Internet implementation are very different, it would not be practical to convert an existing application to run on the Internet. There are a number of Internet flight planners, namely: DTC DUATS and AOPA online, which provide rudimentary flight planning functions. These are, however, for the most part, only text based.

The limitations of the prior art existing computer flight planners fall into two classes—autonomous (a system running the application software and computing the flight plan on a stand-alone computer not connected to the Internet) and flight planners connected to the Internet. The primary deficiency of autonomous applications are as follows: 1) They need a powerful and fast computer with large hard disk magnetic memory capacity and extensive RAM (Random Access Memory) capability. 2) They need to constantly update the applications software and data on a regular basis. 3) They can only run on a limited number of computers since the software must be installed. 4) As a result, they are limited in their performance and are expensive to keep current.

The primary deficiency of existing Internet flight planners of the prior art is that they: 1) For the most part provide only text output for their flight plans. 2) If graphics charts are displayed they do not incrementally scroll. 3) The data provided is of limited detail because of deficient compression and chart generation capability. 4) Routes, waypoints, and weather data can not be overlaid or interactively manipulated over the navigation charts.

PRIOR ART

Current U.S. Classification: 701/120

Field of Search: 701/120/14 707/101,104

U.S. patent Documents

| | | | |
|---|---|---|---|
| 4,347,618 | August, 1982 | Kavouras et al. | 375/37. |
| 4,521,857 | June, 1985 | Reynolds, III | 364/439. |
| 4,807,158 | February, 1989 | Blanton et al. | 364/521. |
| 4,827,419 | May, 1989 | Selby, III | 364/443. |
| 5,111,400 | May, 1992 | Yoder | 364/424. |
| 5,265,025 | November, 1993 | Crabill et al. | 364/443. |
| 5,343,395 | August, 1994 | Watts | 364/428. |
| 5,363,107 | November, 1994 | Gertz et al. | 342/26. |
| 5,369,589 | November, 1994 | Steiner | 364/449. |
| 5,379,215 | January, 1995 | Kruhoeffer et al. | 364/420. |
| 5,390,237 | February, 1995 | Hoffman, Jr. et al. | 379/67. |
| 5,432,895 | July, 1995 | Myers | 395/119. |
| 5,490,239 | February, 1996 | Myers | 395/129. |
| 5,517,193 | May, 1996 | Allison et al. | 342/26. |
| 5,548,515 | August, 1996 | Pilley et al. | 364/439. |
| 5,568,385 | October, 1996 | Shelton | 364/420. |
| 5,583,972 | December, 1996 | Miller | 395/119. |
| 5,675,746 | October, 1997 | Marshall | 395/235. |
| 5,717,589 | February, 1998 | Thompson et al. | 364/420 |
| 6,021,374 | February, 2000 | Wood | 701/301 |
| 6,199,008 | March, 2001 | Aratow, et al. | 701/120 |

REFERENCES CITED

Destination Direct Flight Planning www.flightplan.com
Jeppesen Sanderson www.jeppesen.com.
DTC DUATS www.duats.com
AOPA www.apoa.org
RMS Technology Inc. www.rmstek.com
Free Flight, moving map for pilots;
GTI Electronics Web Page; http://gtielect.ptd.net/index.html, Mar. 9, 1998.
"National Weather Service METAR/TAF Information", METAR/TAF Overview, Jul. 1, 1996; Http://www.nws-.noaa.gov/oso1/oso12/overview.htm.

SUMMARY OF THE INVENTION

1. What is needed is a flight planning systems that is as interactive and dynamic as those found in autonomous applications and as current and economical as those found on the Internet. Thus, the primary object of the invention is to provide the pilot with an economically and efficient method of dynamic and interactive flight planning with data that is accurate and current at all times.
2. Another object of the invention is to provide the pilot with interactive seamless scrollable detailed relief charts suitable for VFR and IFR navigation to help determine the best (e.g. shortest, safest), route in a flight plan over the Internet.
3. Yet another object of the invention is to provide an interactive route line along with waypoints overlaid on VFR, IFR and Road charts over the Internet. Another object is to provide an interactive means of pointing and clicking on waypoints and other chart features and therefore, obtain information about these chart features.
4. Another object of the invention is to provide VFR and IFR flight planning capability, Another object of the invention is to provide an efficient method for optimizing a route based on aircraft data, weather conditions, airspace and topographical constraints.
5. A further object of the invention is to provide an efficient and convenient method for updating navigation, airspace, road data aircraft performance and weight and balance data over the Internet.
6. Still yet another object of the invention is to provide the pilot with an easy and convenient method to file a flight plan with the FAA over the Internet.
7. Other objects and advantages of the present invention will become apparent from the following descriptions, taken in connection with the accompanying drawings, wherein, by way of illustration and example, an embodiment of the present invention is disclosed.

This Invention is a process for generating computer flight plans on the Internet comprising the elements of: a raw X, Y, and Z database of chart data, a data base containing aircraft data; a software system to create VFR, IFR and Road charts, an Internet web site accessible by a Client computer; a software system which computes flight plans requested by means of the Client computer based on aircraft performance, navigation, airspace, topographical and obstruction data; a software system which allows for navigation data and aircraft editing by means of the Internet web site Client computer; a software system which permits for outputting flight plans by means of the Internet web site Client computer; and a software system, which provides for a rapid and economical means to display charts on the Client computer.

The drawings constitute a part of this specification and include exemplary embodiments to the invention, which may be embodied in various forms. It is to be understood that, in some instances, various aspects of the invention may be shown exaggerated or enlarged to facilitate an understanding of the invention.

BRIEF DESCRIPTION OF THE DRAWINGS

FIG. A1 is a flow chart of the operations that comprise the Server.

FIG. A2 is a flow chart of the operations that comprise chart creation.

FIG. A3 is a flow chart of the Chart retrieval, Scrolling, and Routing drawing System.

DETAILED DESCRIPTION OF THE PREFERRED EMBODIMENTS

A detailed description of the preferred embodiment is provided herein. It is to be understood, however, that the present invention may be embodied in various forms. These forms may include, but are not limited to, additional applications of this invention such as the utilization of the invention in the field of cartography, route planning for motor vehicles, marine vehicles and similar usage. Therefore, specific details disclosed herein are not to be interpreted as limiting, but rather as a basis for the claims and as a representative basis for teaching one skilled in the art to employ the present invention in virtually any appropriately detailed system, structure or manner.

An important feature of the above described invention and, one skilled in the art will appreciate, is the fact that some significant limitations imposed by the prior art are effectively eliminated. Prior art being namely existing flight planners running autonomous applications (e.g. application which operate independent of a Server computer, and which normally have the application software and underlying data residing on the computer) on personal computers and Internet based flight planning systems running on a Client computer. While autonomous applications are usually dynamic and interactive, their data is always dated and their performance is limited by the computer's memory constrains and computational capability. The constraint of the existing Internet flight planning systems are numerous: Usually they are characterized by their inability of emulating autonomous applications in that they are static and usually provide only little, if any, interactive chart manipulation. These two limitations will become obvious as a detailed description of this invention unfolds. Most all flight planners require some basic elements to be a useful product such as:

1. A raw X, Y, and Z (latitude, longitude and elevation) database of chart, navigation data, obstruction and topographical data;
2. a system of creating VFR and IFR charts from the raw database, for n number of chart magnifications comprising a given geographical area;
3. a data base containing aircraft performance data, usually in the form of cruise speed, useful load, climb capability, fuel capacity and so forth;
4. a means of delivering the application to the Client computer. This can either be a CD ROM or an Internet web site accessible by a Client computer;
5. a software system which computes flight plans requested, and which allows for outputting flight plans by means of either the resident application software or by mean of the Internet Server to the Client computer if Internet based;
6. and a means of updating and or editing the chart navigation and aircraft data by means of a software system which resides either on the resident application software or a method by means of a software system whereby the data is edited on the Client computer and uploaded to the Internet Server computer if Internet based.

Of significance, and most likely the most important element in flight planning, are the planning charts. These charts are used by the pilot to ascertain route choices given such factors as terrain, distances, weather, navigation aids and so forth. These charts exhibit three distinct characteristics. Namely: VFR (Visual Flight Rules), IFR (Instrument Flight Rules) and Road charts. VFR charts contain topographical features which are color coded and relief chart shaded according to terrain elevation. VFR charts also contain a number of significant features. These features usually include airport data with runway depiction and communication frequencies, major roads, obstruction data, some navigation aids such as VORs (Very High Frequency Omni Directional Radio), and NDBs (Non Directional Beacon). Non aviation data may be included as well, such as geopolitical boundaries, business features such as cities towns, railroads, mines, drive-ins, ranches, waterways and lakes. These chart features aid the pilot in planning his flight under VFR conditions since these features, for the most part, provide visual references. IFR charts contain only limited topographical data such as major water features. However, IFR charts contain a host of navigation data such as airways (routes of flight usually defined by VORs and Intersections), Intersection (e.g. specific check points, usually along a route of flight), NDBs, ILS (Instrument Landing System) depiction, navigation frequencies, distance markers, minimum altitudes for various segments and so forth. These chart features assist the pilot in planning his flight under IFR conditions since they provide instrument references for the most part.

In this invention, the charts are not the traditional paper charts, but are charts generated electronically using a computer software system, this will become apparent further in this description. Also relevant to this Invention is the fact that these charts can be created in a custom fashion (e.g. only the desired chart data need be generated depending on the magnification and or area covered). Each chart may be used by the pilot to best plan his or her flight. In accordance with an important feature of the present invention, a VFR chart created by this invention may be an arbitrary magnification or area, depending on the flight planning needs contemplated. Of major significance is that the largest chart (e.g. in terms of file size) is one that comprises the most zoomed in level covering the largest geographical area. For example, a chart that provides chart resolution of 30 arc seconds in 24 bit color, covering the entire world, would take approximately 2.7 Giga Bytes of file space. Given that this is but one of several chart magnifications required, it is apparent that delivering these types of charts would push the limit of current DVD capacity (4.7-17 GB) and exceed the capability of a CD ROM (600 MB). Existing autonomous flight planners such as FliteStar and FliteSoft address these constrains by creating the required charts on an as needed basis. This approach however, takes a toll on the Client computer memory and computational speed requirements.

However, in this invention, the chart size limitation constrains are eliminated since the charts are pre-built and reside on the Server computer, and only the required chart area and magnification is delivered to the Client computer using conventional and proven Internet Web Browser and HTML technology. Since the size constrains are eliminated, charts may be created that exhibit much greater detail and deliver features such as topographical shading which would be impractical in the prior art.

FIG. A1 Illustrates an Internet server (1), which, according to an embodiment of the invention, is comprised of computer system (2). The computer system includes an Internet connection (3), which serves the Client computer (4). The computer system (2) is controlled by a central processor (CPU) (5). The CPU is connected to a BUS (6), which is further connected to a memory system including a Random Access Memory (RAM) (7). A number of hard disk(s) memory (8), and a CD-ROM (CD Read Only Memory) (9) are also connected to the BUS. The hard drive memory is designed to store programs (10), and data (11)) necessary for the invention by a computer software program (10). The memory is further configured for data processing and program execution by the CPU (5) according to a computer software program (10). A number of interfaces, are provided for connecting to a user interface either locally (12) or by means of an Internet connection (3). An other embodiment of this invention may allow for a process wherein said elements include a local area network consisting of a Server and a number of local Client computers or an Intranet network which is connected by means other than wires such as infrared or radio signals. However, in the preferred embodiment, the invention is realized by the use of the following steps:

1. Turning now to FIG. A2, the charts are created in three distinct steps. These step these are: 1) Create a Background image (e.g. topographical, geopolitical, and water features), 2) overlay Navdata (e.g. airport, navigation aids, airways, roads, towns, obstructions etc.) and 3) add chart text labels. The first step is to create a Background image (16), upon which additional features are overlaid. This is accomplished by means of a Background Image Compiler Software (15) which compiles a data base (14) containing topographical data in the form of X, Y, and Z axis coordinates (e.g. latitude, longitude and terrain elevation) and processes the Background images which are color coded according to elevation. A process also completed by the Background Image Compiler Software is the generating relief chart shading according to elevation and illumination. The Background image (16) is assigned a discrete color corresponding to the terrain elevation. This discrete color closely emulates the colors assigned to a U.S. Government Sectional Aeronautical chart. Relief shading is added by selecting an illumination source (e.g. a virtual sun) and decreasing the RGB (Red Green Blue) values assigned to the topographical color by pre-determined but equal amounts opposite the illumination source. This, in effect, creates the illusion of a relief (e.g. three dimensional) chart. By varying the angle from 0 to 360 degrees, any hour of the day may be emulated. The elevation of the illumination source is modeled by varying the length of the virtual shadow (e.g. the higher the illumination angle, the shorter the shadow and the lower the manifested relief effect). Although, for clarity, the illumination angle is set purposely low to exaggerate the relief effect. In the preferred embodiment the illumination angle is set at the top of the display (north), although any angle is practical. Since there is a limit on the amount of data a micro computer (Server) can process effectively, each Background image is created as a tile (e.g. a finite image are, a number of which comprise the entire image).

2. The next step processes the navigational data (18) to be overlaid onto the Background image (16). The overlaid data is created by means of a Navdata Image Compiler Software (19). This software compiles a data base containing the Navigational data in the form of X, Y, and Z axis coordinates and overlays this data onto the Background image (16). In the preferred embodiment the Navdata is Geo-referenced (e.g. the data is referenced to the absolute latitude and longitude coordinates corresponding to the chart) and overlaid onto the individual Background image tiles.

3. The next step of creating a finished chart is to overlay the chart feature descriptive text labels. This is accomplished by use of a Text De-clutter Compiler software system (20) which processes the raw text and other Textural Descriptive data (17) extracted from the raw Topographical (14) and Navigation data (18) by the Background Image Compiler Software (15) and Navdata Image Compiler Software (19). The Text De clutter Compiler Software processes the Textural Descriptive data in such a way as not to overwrite one text element with another. In the prior art, de-cluttering was achieved by checking for text collision. However, in these prior art implementations, no process was put in place to move the colliding text to a non-colliding area on the chart. However, in this invention, the Text De-clutter Compiler Software moves text labels to a no-collision area on the chart. In the preferred embodiment a database comprising the feature and textural description is created for the entire magnification level and geographical area. The text labels are then checked to ensure that there are no collisions (text overwriting other text). In the event of a collision, the colliding text elements are repositioned in the X,Y coordinates and then re-checked for collision. This process is repeated until no text collisions occur. Text elements are given a priority, and the lowest priority text, in the event of a collision, will not be drawn. Thus, if there is insufficient room to display the text without text collision, it is removed and not displayed.

4. The Composite image (e.g. Background Image, Navigation data etc., & text data) chart is created by means of a Text Image Compiler Software (23) which overlays the De-cluttered Textural Descriptive Data (22) onto the Background Image (21) which contains the Navdata as well. It should be noted that one embodiment may include a process wherein said element comprise a data base of rasterized charts consisting of pre-defined scales and chart features and a data base of routes consisting of pre-defined waypoint.

5. The final step applies JPG compression by means of the Cached Image Generator and JPEG compression software (25) to the Composite Image (24) and adds these compressed files to the Cached Image (charts) files library. Depending on the required chart size and magnification, such image compression and sizing is accomplished, prior to submitting the image to the Client computer. Steps one (1) through (5) are repeated for each magnification level and geographical area and for each chart type (VFR, IFR, Road Chart).

In keeping with one of the important primary objects of the invention, the chart library does not need to reside on Client computer memory. As a consequence, the Client must request charts as needed for display and flight planning. These charts typically cover the area over which the planned flight is contemplated. In order to keep the Internet flight planning interactive and responsive, the Server-Client communications time must be minimized. Initially (e.g. when the system is first put on line), it is very unlikely that the Client's requested charts exist in a form required for distribution by the Server. That is, in that the requested charts have been compressed and prepared in a pre-cached file library (e.g. pre-cached files are those which have previously been processed in such a manner as to make them immediately available for distribution to the Client computer). Thus, in this invention, a software system (26) generates, upon analysis by the Server Computer (2), on an as-required basis, a number of pre-cached files which meet the Client's chart magnification and geographical area requirements each time the Client requests a chart. Since the Server requires some finite amount of time to process the requested pre-cached charts, it is beneficial to accomplish this processing only once for any anticipated pre-cached chart. Furthermore, allowing the system to create a pre-cached chart for all possible combinations of magnifications and geographical areas, would create a very large, if not, unlimited number of pre-cached files. And as a result, place an undue burden on the Server's memory requirements. In the preferred embodiment, and given these constrains, the Server-Client interaction in terms of charts requests is accomplished utilizing these steps:

1) Turning now to FIG. A3. The software system previously described compiles the desired charts requested by the Client computer into a pre-cached library (26) residing on hard disk memory. When the Client computer (4) requests a chart, it sends the Client's computer display screen's (27)

anchor X,Y coordinates (e.g. usually the upper left most coordinate where X=0 and Y=0), the screen's width in terms of pixels (e.g. a pixel is one computer display element comprising an RGB attribute in 24 bit depth) and the screen's height in terms of pixels.

2) The Cached Image and JPEG Compression Software (25) analyzes the request and determines whether or not the requested chart is contained in the pre-cached chart library (26). If the pre-cached file exists, it sends it to the Client (4). If the pre-cached file does not exist, it builds the requested chart from the finished chart database by creating a pre-cached file wherein the rounded down value is the incremental value of X=the nearest tile width/4, and the rounded down value is the incremental value of Y=the nearest tile width/4. This ensures that there is only a finite number of pre-cached files. Then, after the new file has been processed, it is compressed using the JPEG format and sent to the pre-cached library (26) and to the Client computer for display and further flight planning manipulation.

Having observed the details of the chart creation and chart distribution by the Client computer, attention may now be given to the interaction the user has with the chart by means of the Client computer. As noted previously, Internet flight planners of prior art are static and do not allow for dynamic chart manipulation. For example, if a chart is loaded onto the Client's computer, it is only viewable. The chart can not be scrolled nor can it be magnified. If a new chart is desired, the Client computer has to request this. Once requested, the screen is totally refreshed and a new chart is drawn. A major undesirable side effect of this process is that the user looses his reference and confusion is added to the planning process. It is also desirable to be able to overlay route lines, waypoints, weather and other features over the flight planning chart. Internet flight planners of prior art do not allow this since they have not made provision to identify and isolate the route line or other chart features by means of a mouse or other input device. Thus, on Internet flight planners of prior art the route must be generated and built on the Server. Then once built and combined as a new image the Server must upload the image onto the Client computer. This forces the screen to be totally refreshed, which again produces the undesirable side effect of the user loosing his reference and adding confusion to the planning process.

Now observing FIG. A3, and in accordance with an important aspect (one of the main features) of the invention these shortcomings are overcome by means of:

1) A Chart Scrolling software system (28), residing on an Internet Server hard disk (8), which facilitates chart scrolling and chart viewing without refreshing the entire Client computer display (27). Pursuant to the invention, the loaded chart (29) is always larger (e.g. the absolute X, Y, pixel dimension) than the assigned chart window area (30) residing on the Client Display (28). This provides two very important benefits. First, it allows the Client's browser to turn on the scroll bars, and second, as a result, the chart may be scrolled up to the limit of the underlying loaded chart, 2) In the preferred embodiment, if the chart scrolling results in moving past an area beyond the bounds of a previously loaded chart, a window pops up and informs the user that a new chart segment is being loaded. During this loading process, the previously loaded chart remains on screen (e.g. the user is able to view the remaining chart without loosing his reference). A new cached chart is then delivered to the Client corresponding to the newly desired chart area and/or magnification. The effect of this process is such that the user views the new chart segment as though it where seamlessly merged with the original chart.

Having observed the details of the chart scrolling, attention may now be given to the process by which routes, waypoints and other features are overlaid on the flight planning chart. In the preferred embodiment this capability is provided by means of:

1) A process consisting of a software system which computes the steps of overlaying routes and waypoints and other polygons. A limitation of the existing art is that current HTML technology does not provide for vectored lines to be drawn over an existing image on a Client computer. The required technology however, is to use an XML extension. These extensions provide for several vector XML plug-ins for the Internet browser. In the preferred embodiment VML technology from Microsoft is employed.

2) To accomplish the requirements of drawing vectored lines and features on a chart on the Client computer, a software system residing on the Server (1) generates an Internet Web site with n number of web pages. One of these Internet web pages is uploaded from the Server (1) to the Client (4) and in this invention, is designed to incorporate three frames. These three frames are contained in one parent frame, this allows the scrolling of the Background chart image and route to remain synchronized while only one frame is visible to the Client user, the other two frames provide important functions. In the preferred embodiment, the background frame (36) contains the viewable chart (e.g. the frame is visible). The foreground frame (37) is transparent except for the route line (38) and or waypoints features to be overlaid on the chart background frame (36). Frame (39) is the housekeeping frame. This frame directs what features are to be drawn on the transparent frame (37). Following the preferred procedure, when a mouse click is detected on the chart, the X,Y coordinates of this mouse click are sent to frame (39). This frame (39) then updates with the new X,Y, coordinates. If the mouse click falls coincident with a waypoint from the data waypoint database (e.g. the X,Y, coordinates corresponding to a Geo-referenced latitude and longitude navigation data element), this waypoint will be selected, or else a new user waypoint will be created. Given this information, frame (39) then instructs frame (37) from which starting X,Y coordinates to which ending X,Y coordinates to draw the route line on frame (37). Finally, frame (39) updates the route list with the new waypoint (e.g. a column of waypoints in flight plan order, usually shown on the left side of the flight planning window). This process is repeated for a plurality of route line segments and waypoint selected. It should be noted that these frames are not exclusive. Other frames, such as the route profile window are also incorporated.

An another embodiment of this invention includes a process comprising of the step(s) of computing by means of a software systems a cross section of the flight plan and displaying same in a profile window in which the route is displayed relative to terrain elevation, obstruction elevation, airspace, weather and flight altitude.

An another embodiment of this invention includes a process comprising of the step(s) of prompting and managing the required flight planning parameters by means of an Internet web site software which resides on the Server such flight planning variables inputted and requested by the remote computer. A further step in this embodiment includes the steps(s) of computing by means of a software system the computed flight plans requested using the Internet web site remote computer.

An another embodiment of this invention includes a process comprising of the step(s) of filing flight plans by means of a software system through the use of the Internet web site Client computer and the steps of printing reports by means of a software system through the use of the Internet web site Client computer.

An another embodiment of this invention includes a process comprising of the step(s) of facilitating navigation data entry and editing by means of a software system of the Internet web site remote computer and further facilitating the entry and editing by means of a software system, aircraft performance data editing through the use of the Internet web site Client computer.

An another embodiment of this invention includes a process comprising of the process wherein said step provides for overlay of graphical weather and textural data over the VFR, IFR, or Road chart along with the route line and waypoints on the Internet web site Client computer.

An another embodiment of this invention includes a process comprising of the step(s) includes the process by which route waypoints are selected based on topographical, navigational, weather, geopolitical, airspace, and aircraft performance constrains.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for generating a flight plan for preflight use by a pilot, comprising:
    accessing over a computer network from a client computer a Web page having a housekeeping frame and a selected composite travel navigation chart from among plural selected composite travel navigation charts stored at a server computer, each selected composite travel navigation chart including a travel chart merged with travel navigation waypoints, the travel navigation waypoints including radio navigation aids;
    downloading the Web page with the selected composite travel navigation chart from the server computer to the client computer as a two-dimensional array of map tiles that include up-to-date navigation data and cover an area over which a flight is to be planned;
    indicating X, Y coordinates of each of a plurality of navigation waypoints on the selected composite travel navigation chart at the client computer;
    sending the X, Y coordinates of each navigation waypoint to the housekeeping frame of the Web page; and
    drawing over the selected composite travel navigation chart on the client computer route line segments according to the X, Y coordinates, as instructed by housekeeping frame of the Web page, to generate a flight plan for preflight use by a pilot.

2. The process of claim 1 in which the navigation waypoints are included in a frame that overlays the selected composite travel navigation chart at the client computer.

3. The process of claim 1 in which the route line segments are drawn on a frame that overlays the selected composite travel navigation chart.

4. The process of claim 1 further comprising displaying on the client computer less than all of the selected composite travel navigation chart that is downloaded from the server computer.

5. The process of claim 1 further comprising displaying the selected composite travel navigation chart that is downloaded from the server computer within a browser running on the client computer.

6. The process of claim 5 in which the route line segments overlay the selected travel chart and are formed as vector lines within the browser running on the client computer.

7. The process of claim 1 further comprising overlaying plural text labels on the selected composite travel navigation chart and preventing any of the text labels from overlaying another.

8. The process of claim 1 in which the flight plan is outputted at the client computer.

9. The process of claim 1 in which the flight plan is filed with a travel-regulating agency over the computer network.

10. The process of claim 1 in which the radio navigation aids include VORs (Very High Frequency Omni-Directional Radios) and NDBs (Non-Directional Beacons).

11. A process for generating a flight plan for preflight use by a pilot, comprising:
    accessing over a computer network from a client computer a Web page having a housekeeping frame and a selected composite travel navigation chart from among plural selected composite travel navigation charts stored at a server computer, each selected composite travel navigation chart including a travel chart merged with travel navigation waypoints, the travel navigation waypoints including radio navigation aids;
    downloading the Web page with the selected composite travel navigation chart from the server computer to the client computer as a two-dimensional array of map tiles that include up-to-date navigation data and cover an area over which a flight is to be planned;
    indicating X, Y coordinates of each of a plurality of navigation waypoints on the selected composite travel navigation chart at the client computer;
    sending the X, Y coordinates of each navigation waypoint to the housekeeping frame of the Web page;
    drawing over the selected composite travel navigation chart on the client computer route line segments according to the X, Y coordinates, as instructed by housekeeping frame of the Web page, to generate a flight plan for preflight use by a pilot;
    displaying on the client computer less than all of the selected composite travel navigation chart that is downloaded from the server computer; and
    scrolling across the selected composite travel navigation chart at the client computer to display a portion of the selected composite travel navigation chart that was not previously displayed, without downloading from the server computer as part of the scrolling the portion of the selected composite travel navigation chart that was not previously displayed.

12. The process of claim 11 in which the travel navigation waypoints are included in a frame that overlays the selected travel navigation chart.

13. The process of claim 11 in which the route line segments are drawn on a frame that overlays the selected travel navigation chart.

14. The process of claim 11 further comprising displaying the selected composite travel navigation chart within a browser running on the client computer.

15. The process of claim 14 in which the route line segments overlay the selected travel chart and are vector lines within the browser running on the client computer.

16. The process of claim 11 in which downloading the selected composite travel navigation chart from the server computer to the client computer includes downloading a two-dimensional array of map tiles that together form the composite travel navigation chart.

17. The process of claim 11 further comprising overlaying plural text labels on the selected composite travel navigation chart and preventing any of the text labels from overlaying another.

18. The process of claim 11 in which the flight plan is outputted at the client computer.

19. The process of claim 11 in which the flight plan is filed with a travel-regulating agency over the computer network.

20. The process of claim 11 in which the radio navigation aids include VORs (Very High Frequency Omni-Directional Radios) and NDBs (Non-Directional Beacons).

21. A flight plan generating method, comprising:
providing a Web page having a housekeeping frame and a selected composite travel navigation chart over a computer network to a browser on client computer, the selected composite travel navigation chart including a selected travel chart merged with travel navigation waypoints, the travel navigation waypoints including radio navigation aids;
displaying at least a portion of selected composite travel navigation chart in the browser on the client computer as a two-dimensional array of map tiles that include up-to-date navigation data and cover an area over which a flight is to be planned;
indicating X, Y coordinates of each of a plurality of navigation waypoints on the selected composite travel navigation chart displayed in the browser on the client computer;
sending the X, Y coordinates of each navigation waypoint to the housekeeping frame of the Web page; and
drawing over the selected composite travel navigation chart in the browser on the client computer route line segments according to the X, Y coordinates, as instructed by housekeeping frame of the Web page, to generate a flight plan for preflight use by a pilot.

22. The method of claim 21 further comprising filing the travel plan computed at the server computer with an entity that receives filed travel plans.

23. The process of claim 21 in which the radio navigation aids include VORs (Very High Frequency Omni-Directional Radios) and NDBs (Non-Directional Beacons).

* * * * *